United States Patent
Betker

(10) Patent No.: US 7,362,717 B1
(45) Date of Patent: Apr. 22, 2008

(54) METHOD AND SYSTEM FOR USING DISTRIBUTED NAME SERVERS IN MULTI-MODULE FIBRE CHANNEL SWITCHES

(75) Inventor: Steven M. Betker, Shoreview, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 950 days.

(21) Appl. No.: 10/263,858

(22) Filed: Oct. 3, 2002

(51) Int. Cl.
*H04L 12/28* (2006.01)

(52) U.S. Cl. .................................. 370/254; 709/224

(58) Field of Classification Search ............... None
See application file for complete search history.

(56) References Cited

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,367,520 A | 11/1994 | Cordell | 370/60 |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |

(Continued)

FOREIGN PATENT DOCUMENTS

EP   0649098   9/1994

(Continued)

OTHER PUBLICATIONS

Brown, Douglas W., "A State-Machine Synthesizer", *18th Design Automation Conference*, (1981),301-305.

(Continued)

*Primary Examiner*—Wing Chan
*Assistant Examiner*—Michael J. Moore
(74) *Attorney, Agent, or Firm*—Klein, O'Neill & Singh, LLP

(57) ABSTRACT

A method for processing a Get Identifier ("GI_A") command received by a switch module of a multi-module fiber channel switch with a plurality of switch modules is provided. The method comprises determining if a domain value in the GI_A command is that of the multi-module switch; and if the domain value is equal to that of the multi-module fiber channel switch and if the GI_A command is not sent by one of the plurality of switch modules of the multi-module fiber channel switch, then combining replies from the plurality of switch modules of the multi-module switch with a reply of the switch module receiving the GI_A command; and sending the combined reply to a source of the GI_A command.

9 Claims, 9 Drawing Sheets

U.S. PATENT DOCUMENTS

| | | |
|---|---|---|
| 5,701,416 A | 12/1997 | Thorson et al. |
| 5,706,279 A | 1/1998 | Teraslinna |
| 5,748,612 A | 5/1998 | Stoevhase et al. .......... 370/230 |
| 5,805,924 A * | 9/1998 | Stoevhase ..................... 710/11 |
| 5,812,525 A | 9/1998 | Teraslinna |
| 5,818,842 A | 10/1998 | Burwell et al. ............. 370/397 |
| 5,821,875 A | 10/1998 | Lee et al. |
| 5,825,748 A | 10/1998 | Barkey et al. |
| 5,828,475 A | 10/1998 | Bennett et al. |
| 5,835,752 A | 11/1998 | Chiang et al. |
| 5,850,386 A | 12/1998 | Anderson et al. |
| 5,894,560 A | 4/1999 | Carmichael et al. |
| 5,954,796 A | 9/1999 | McCarty et al. |
| 5,978,359 A | 11/1999 | Caldara et al. |
| 5,987,028 A | 11/1999 | Yang et al. .................. 370/380 |
| 5,999,528 A | 12/1999 | Chow et al. ................. 370/365 |
| 6,014,383 A | 1/2000 | McCarty ..................... 370/453 |
| 6,021,128 A | 2/2000 | Hosoya et al. ............... 370/380 |
| 6,026,092 A | 2/2000 | Abu-Amara et al. |
| 6,031,842 A | 2/2000 | Trevitt et al. |
| 6,047,323 A | 4/2000 | Krause ........................ 709/227 |
| 6,055,618 A | 4/2000 | Thorson |
| 6,061,360 A | 5/2000 | Miller et al. |
| 6,081,512 A | 6/2000 | Muller et al. ................ 370/256 |
| 6,108,738 A | 8/2000 | Chambers et al. |
| 6,108,778 A | 8/2000 | LaBerge |
| 6,118,776 A | 9/2000 | Berman |
| 6,128,292 A | 10/2000 | Kim et al. .................... 370/356 |
| 6,144,668 A | 11/2000 | Bass et al. |
| 6,160,813 A | 12/2000 | Banks et al. ................. 370/422 |
| 6,201,787 B1 | 3/2001 | Baldwin et al. |
| 6,229,822 B1 | 5/2001 | Chow et al. |
| 6,240,096 B1 | 5/2001 | Book |
| 6,253,267 B1 | 6/2001 | Kim et al. |
| 6,289,002 B1 | 9/2001 | Henson et al. |
| 6,308,220 B1 | 10/2001 | Mathur ........................ 709/238 |
| 6,324,181 B1 | 11/2001 | Wong et al. ................. 370/403 |
| 6,330,236 B1 | 12/2001 | Ofek et al. ................... 370/369 |
| 6,353,612 B1 | 3/2002 | Zhu et al. |
| 6,370,605 B1 | 4/2002 | Chong |
| 6,401,128 B1 | 6/2002 | Stai et al. |
| 6,411,599 B1 | 6/2002 | Blanc et al. ................. 370/219 |
| 6,411,627 B1 | 6/2002 | Hullett et al. |
| 6,418,477 B1 | 7/2002 | Verma |
| 6,421,711 B1 | 7/2002 | Blumenau et al. |
| 6,424,658 B1 | 7/2002 | Mathur ........................ 370/429 |
| 6,449,274 B1 | 9/2002 | Holden et al. ............... 370/392 |
| 6,452,915 B1 | 9/2002 | Jorgensen |
| 6,457,090 B1 | 9/2002 | Young |
| 6,467,008 B1 | 10/2002 | Gentry et al. |
| 6,470,026 B1 | 10/2002 | Pearson et al. |
| 6,532,212 B1 | 3/2003 | Soloway et al. |
| 6,570,850 B1 | 5/2003 | Gutierrez et al. |
| 6,570,853 B1 | 5/2003 | Johnson et al. |
| 6,594,231 B1 | 7/2003 | Byham et al. |
| 6,597,691 B1 | 7/2003 | Anderson et al. ........... 370/360 |
| 6,597,777 B1 | 7/2003 | Ho |
| 6,614,796 B1 | 9/2003 | Black et al. |
| 6,697,359 B1 | 2/2004 | George ........................ 370/357 |
| 6,697,368 B2 | 2/2004 | Chang et al. |
| 6,718,497 B1 | 4/2004 | Whitby-Strevens |
| 6,744,772 B1 | 6/2004 | Eneboe et al. |
| 6,760,302 B1 | 7/2004 | Ellinas et al. |
| 6,765,919 B1 * | 7/2004 | Banks et al. ................. 370/401 |
| 6,772,207 B1 * | 8/2004 | Dorn et al. ................... 709/224 |
| 6,785,241 B1 | 8/2004 | Lu et al. |
| 6,807,181 B1 | 10/2004 | Weschler |
| 6,816,750 B1 | 11/2004 | Klaas |
| 6,859,435 B1 | 2/2005 | Lee et al. |
| 6,865,157 B1 | 3/2005 | Scott et al. |
| 6,886,141 B1 | 4/2005 | Kunz et al. |
| 6,941,357 B2 | 9/2005 | Nguyen et al. |
| 6,941,482 B2 * | 9/2005 | Strong ......................... 713/400 |
| 6,952,659 B2 | 10/2005 | King et al. |
| 6,968,463 B2 | 11/2005 | Pherson et al. |
| 7,000,025 B1 | 2/2006 | Wilson |
| 7,002,926 B1 | 2/2006 | Eneboe et al. |
| 7,010,607 B1 | 3/2006 | Bunton |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,055,068 B2 | 5/2006 | Riedl |
| 7,061,871 B2 | 6/2006 | Sheldon et al. |
| 7,092,374 B1 | 8/2006 | Gubbi |
| 7,110,394 B1 | 9/2006 | Chamdani et al. |
| 7,124,169 B2 | 10/2006 | Shimozono et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,215,680 B2 | 5/2007 | Mullendore et al. |
| 7,221,650 B1 | 5/2007 | Cooper et al. |
| 7,245,613 B1 | 7/2007 | Winkles et al. |
| 7,248,580 B2 | 7/2007 | George et al. |
| 7,269,131 B2 | 9/2007 | Cashman et al. |
| 7,292,593 B1 | 11/2007 | Winkles et al. |
| 2001/0011357 A1 | 8/2001 | Mori |
| 2001/0038628 A1 | 11/2001 | Ofek et al. .................. 370/392 |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0191602 A1 | 12/2002 | Woodring et al. |
| 2002/0196773 A1 | 12/2002 | Berman |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0072316 A1 | 4/2003 | Niu et al. |
| 2003/0076788 A1 * | 4/2003 | Grabauskas et al. ........ 370/254 |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0103451 A1 | 6/2003 | Lutgen et al. |
| 2003/0117961 A1 | 6/2003 | Chuah et al. |
| 2003/0120983 A1 | 6/2003 | Vieregge et al. |
| 2003/0126223 A1 | 7/2003 | Jenne et al. |
| 2003/0137941 A1 | 7/2003 | Kaushik et al. |
| 2003/0174652 A1 | 9/2003 | Ebata |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0189930 A1 | 10/2003 | Terrell et al. |
| 2003/0189935 A1 | 10/2003 | Warden et al. |
| 2003/0195983 A1 | 10/2003 | Krause |
| 2003/0218986 A1 | 11/2003 | Claudio et al. |
| 2003/0229808 A1 | 12/2003 | Heintz et al. |
| 2004/0013092 A1 | 1/2004 | Betker et al. |
| 2004/0013125 A1 | 1/2004 | Betker et al. |
| 2004/0015638 A1 * | 1/2004 | Forbes ........................ 710/316 |
| 2004/0022199 A1 * | 2/2004 | Hammons et al. .......... 370/254 |

| | | |
|---|---|---|
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ........................ 370/463 |
| 2004/0151188 A1 | 8/2004 | Naveen et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0117522 A1 | 6/2005 | Basavaiah et al. |
| 2005/0177641 A1 | 8/2005 | Yamagami |
| 2005/0198523 A1 | 9/2005 | Santosh et al. |
| 2006/0013248 A1 | 1/2006 | Mujeeb et al. |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0184711 A1 | 8/2006 | Pettey |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

Curtis, A. R., "Design Considerations for 10-Gbit Fibre Channel", *Curtis A. Ridgeway, Distinguished I/O Architect, Storage and Computing ASIC's Division, LSI Logic Corp.*

Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001),197-211.

Ridgeway, Curt, "0GFC-40GFC using 4-lane XAUI's", *LSI Logic Presentation—T11/03-069v0*.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al, "Virtual Channel Architecture", Presentation by Brocade to T11/03-369V0 dated Jun. 2, 2003.

Fibre Channel Switch Fabric—2 (FC-SW-2) Rev 5.4, NCITS working draft proposed American National Standard for Information Technology, Jun. 26, 2001., T11/Project 1305-D/Rev 5.4.

Fibre Channel Generic Services—3 (FC-GS-3) Rev 7.01, NCITS working draft proposed American National Standard for Information Technology, Nov. 28, 2000., T11/Project 1356 D/Rev 7.01.

Banks, David C., et al., "Link Trunking and Measuring Link Latency in Fibre Channel Fabric", U.S. Appl. No. 60/286,046, 1-52.

"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
Malavalli, et al., "Fibre Channel Framing and Signaling (FC-FS) Rev 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Jan. 19, 2007 for U.S. Appl. No. 10/302,149".
"Office Action from USPTO dated Aug. 20, 2007 for U.S. Appl. No. 10/302,149".
"Examination Report from the European Patent Office dated Oct. 12, 2007 for European Application No. 05 805 632.6".
Banks, David C., et al., "Link Trunking and Measuring Link Latency in Fibre Channel Fabric", U.S. Appl. No. 60/286,046, 1-52, 1990.
Curtis, A. R., "Design Considerations for 10-Gbit Fibre Channel", *Curtis A. Ridgeway, Distinguished I/O Architect, Storage and Computing ASIC's Division, LSI Logic Corp.*, 1990.

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Office Action from USPTO dated Jan. 9, 2008 for U.S. Appl. No. 11/608,634".

"Office Action from USPTO dated Jan. 9, 2008 for U.S. Appl. No. 10/798,468".

* cited by examiner

METHOD AND SYSTEM FOR USING DISTRIBUTED NAME SERVERS IN MULTI-MODULE FIBRE CHANNEL SWITCHES

BACKGROUND

1. Field of the Invention

The present invention relates to fibre channel switches, and more particularly to using distributed Name Server data in multi-module fibre channel switches.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel fabric devices include a node port or "N_Port" that manages fabric connections. The N_port establishes a connection to a fabric element (e.g., a switch) having a fabric port or F_port. Fabric elements handle routing, error detection, recovery, and similar management functions.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware. The fibre channel switch provides circuit/packet switched topology by establishing multiple simultaneous point-to-point connections.

A fibre channel switch is a multi-port device where each port manages a simple point-to-point connection between itself and its attached system. Each port can be attached to a server, peripheral, I/O subsystem, bridge, hub, router, or even another switch. A switch receives a message from one port and automatically routes it to another port. Multiple calls or data transfers happen concurrently through the multi-port fibre channel switch.

Fibre channel switches may use multiple modules (also referred to as "blades") connected by fibre channel ports. Conventionally, a multi-module switch is integrated as a single switch and appears to other devices in the fibre channel fabric as a single switch.

Fibre Channel Generic Services (FC-GS-3) specification describes in section 5.0 various fibre channel services that are provided by fibre channel switches including using the "Name Server" to discover fibre channel devices coupled to a fabric.

A Name server provides a way for N_Ports and NL_Ports to register and discover fibre channel attributes. Request for Name server commands are carried over the Common Transport protocol, also defined by FC-GS-3. The Name server information is distributed among fabric elements and is made available to N_Ports and NL_Ports after the ports have logged in.

Various commands are used by the Name Server protocol, as defined by FC-GS-3, for registration, de-registration and queries.

Fiber Channel Switched Fabric (FC-SW-2) specification describes how a Fabric consisting of multiple switches implements a distributed Name Server.

The current fibre channel standards or conventional techniques do not provide an efficient way to share Name Server data among the blades, such that the multi-module switch appears to the rest of the fabric as a single switch.

In addition, the Fiber Channel standards do not provide any method for sharing Name Server information on multiple independent switch modules that are part of the same switch.

Therefore, what is required is a process and system that allows multiple switch modules to implement Name Server commands so that the multiple switch modules appear as one switch to the rest of the Fabric.

SUMMARY OF THE INVENTION

In one aspect, the present invention allows a group of switch modules to be combined into a single switch for Name Server operations and hence allows efficient execution of Name Server commands.

In one aspect of the present invention, a method for processing a Get All Next ("GA_NXT") Server command in a multi-module fibre channel switch is provided. The method includes, determining if the command is from an N-Port; sending the command to other switches and switch modules within the multi-module switch; determining if replies received from other switch modules and/or switches are better than a current reply; and sending the current reply if the received reply is not better than the current reply.

The method further includes, sending the current reply to a command source if the command is not from an N-Port or from another switch module.

The method also includes, sending the received reply to the command source if the received reply is better than the current reply.

In another aspect of the present invention, a method for processing a Get Identifier ("GI_A") command in a multi-module fibre channel switch is provided. The method includes, determining if a domain value in the command is that of a local switch module receiving the command; and preparing a reply to the command based on replies from other switch modules if the command is not received from an external switch.

The method also includes, sending the command to switch modules with a domain value greater than zero and the domain value in the command matches the switch module; and sending a reply to the switch module with the matching domain value.

The method also includes, sending a list of domains, if the domain value of the command is equal to zero.

In yet another aspect of the present invention, a method for processing Gxx_ID commands in a multi-module switch operationally coupled in a fibre channel system is provided. The method includes, determining if the command is received from an N-Port, if a port identification value in the command is not the same as that of a multi-module switch that receives the command; and sending the command to a switch whose port identification matches with the port identification value in the command.

The method further includes, determining if the command is received from an external fibre channel switch; and sending the command to a switch whose port identification value matches with the port identification value of the command.

In yet another aspect of the present invention, a method for processing a command that searches for a Name Server object (GID_PN etc.) by a multi-module fibre channel switch in a fibre channel system is provided. The method includes, determining if the port identifier command is received from an N-Port; sending the command to other switches and switch modules, if the command is from an N-Port; and sending successful replies, if any, received from the switches and/or switch modules.

The method also includes, determining if the port identifier command is received from an external switch, if the port identifier command is not from an N_Port;

sending the command to other switch modules, if the command was received from an external switch; or sending an error message if the command was not received from an external switch.

In yet another aspect of the present invention, a method for processing a port identifier command that returns a list of port identifiers (GID_FT etc., described below) by a multi-module fibre channel switch in a fibre channel system is provided. The method includes, determining if the port identifier command is received from an N-Port; sending the port identifier command to other switches and switch modules, if the port identifier command is from an N-Port; and sending data combined from the replies, if any, received from the switches and/or switch modules.

The method also includes, determining if the port identifier command is received from an external switch, sending the command to other switch modules, if the command was received from an external switch; or sending just local switch module reply data if the port identifier command was not received from an external switch.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"Blade": A module in a fibre channel switch.

"Blade_Id": A unique identifier for identifying a switch module.

"EBP": Exchange Blade Parameters, created by Multi-Blade Protocol

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

Multi Blade protocol: A protocol that operates on internal switch module ports to assign a primary blade.

Port: A general reference to N. Sub.-- Port or F.Sub.--Port.

The Fibre Channel Specification used to build one embodiment of the present invention includes:

FC-SW-2; and

FC-GS-3, standards as published by the American National Standard Institute.

To facilitate an understanding of the preferred embodiment, the general architecture and operation of a fibre channel system will be described. The specific architecture and operation of the preferred embodiment will then be described with reference to the general architecture of the fibre channel system.

Figure 1:
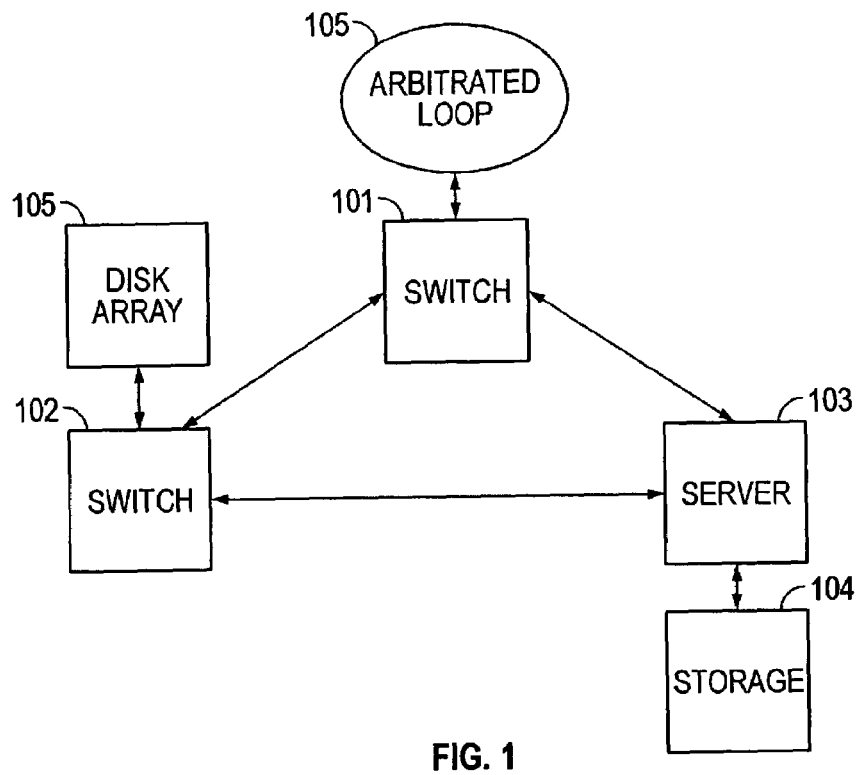
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An inter-switch link ("ISL") enables N_Ports to operationally couple to other N-Ports in a fabric.

Figure 2:
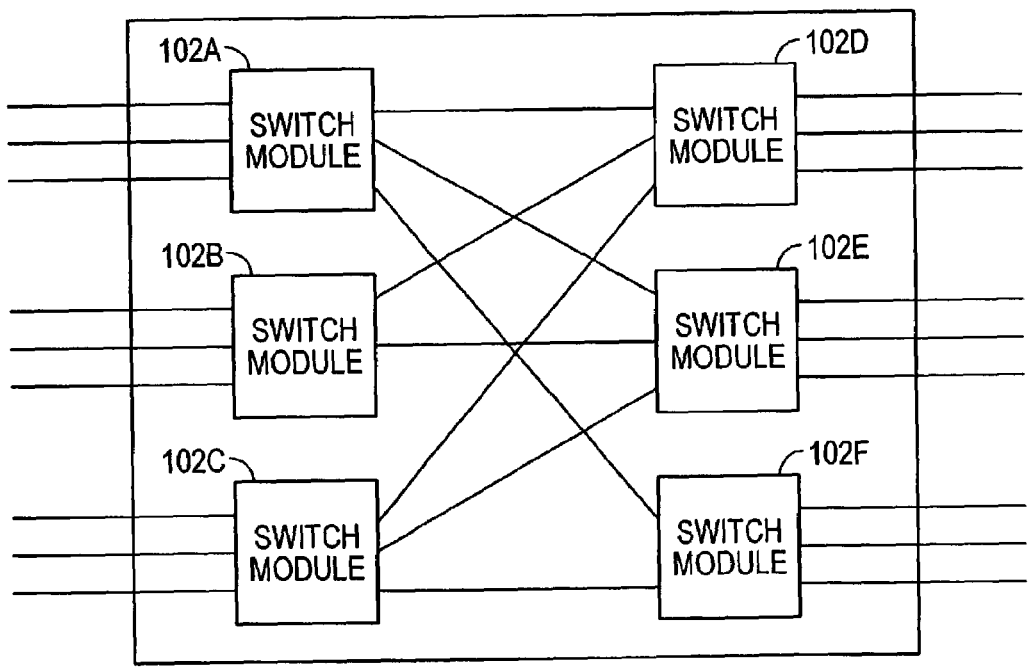
FIG. 2 is a block diagram showing multi-module switch.

FIG. 2 is a block diagram that shows plural switch modules (or blades) 102A-102F integrated into a single multi-module switch 200. Internal ports between the switch modules operate on a multi-blade protocol, while external ports operate under FC-SW-2 protocol.

Figure 3:
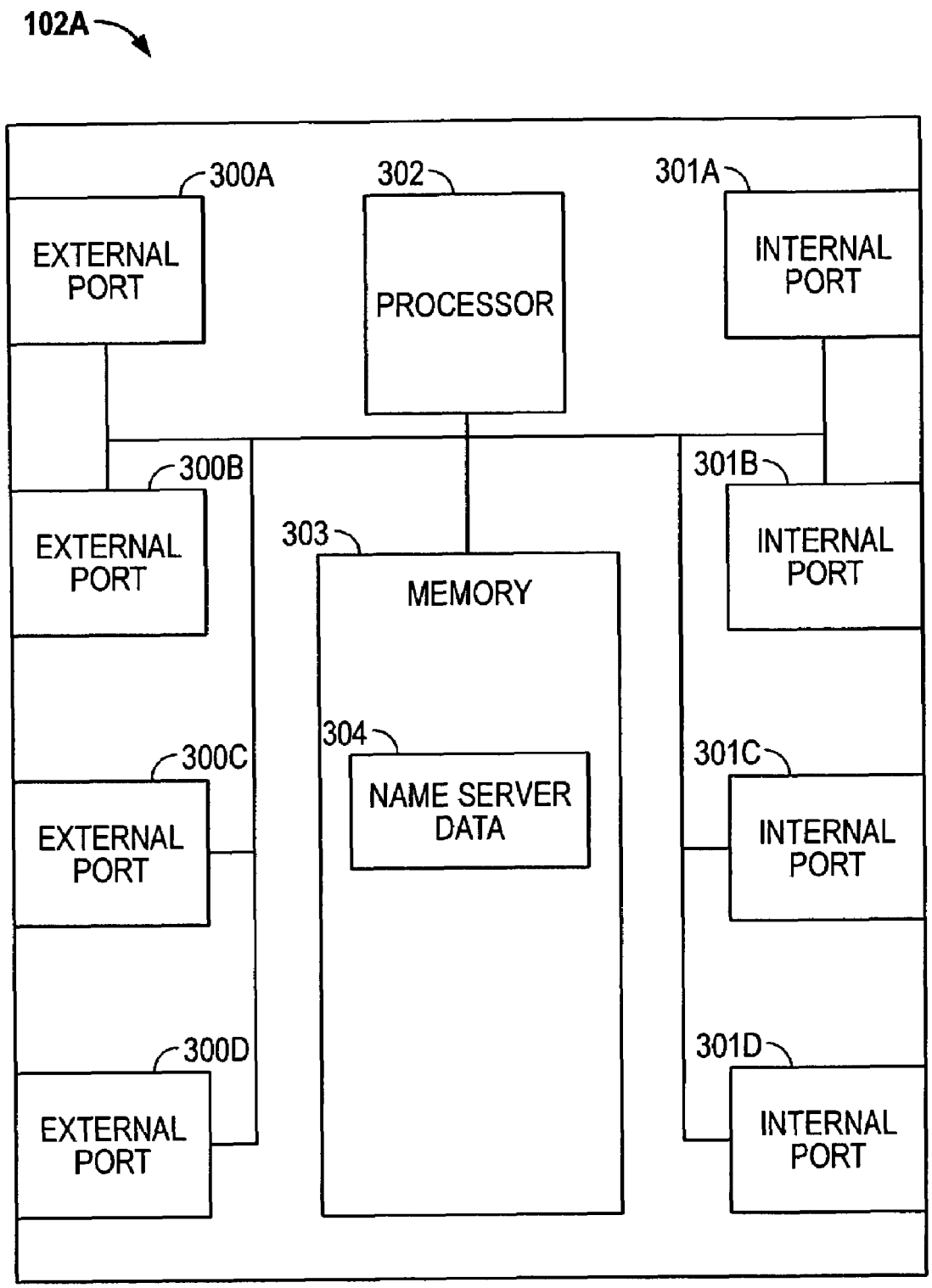
FIG. 3 is block diagram of a switch module in a multi-module switch environment, according to one aspect of the present invention.

FIG. 3 is a block diagram of a blade in a multi-module switch, e.g. blade 102A, that implements the adaptive aspects of the present invention. Switch module 102A includes plural external ports (F_Ports operationally coupled to other devices, e.g. server 103; or E_Ports coupled to other switch modules) 300A through 300D; and internal ports 301A-301D that operate under the multi-blade protocol.

Switch module 102A also includes processor 302 to execute the process steps described below. Processor 302 may be a Pentium™ Class sold by Intel Corporation, or any other processor may be used to implement the adaptive aspects of the present invention. Processor 302 can access memory 303 via bus 302A. In one aspect of the present invention, memory 303 can store Name Server data 304A, as well as the executable process steps of the present invention.

For a multi-module switch 200, each switch module (102A-102F) maintains Name Server data 304A for devices attached to its internal ports. Fibre channel frames addressed to a switch module are identified by a special address of hex values 'FFF8xx' where "xx" is the module's slot number.

Each switch module (102A-102F) stores Name Server 304 for external N-ports that are logged in to that switch module. Distributed Name Server 304 includes Name Server data 304A and the Name Server code (not shown) executed by processor 302 and adds an extra layer of distribution to get Name Server data 304A from other switch modules on the same switch. Distributed Name Server 304 commands that are sent to other switch modules on the same switch may use a Blade Controller address (0xFFF8xx, where 'xx' is the slot number of the switch module).

A switch module that sends distributed Name Server 304 commands to other switches or switch modules assigns a value in the IN_ID field of the CT Header (as defined in FC-GS-3) to match replies to the original command. All other switches or switch modules that get distributed Name Server 304 commands preserve the IN_ID field in the replies.

A distributed Name Server 304 control block structure (is a part of Name Server data) (dns_cb) is defined for keeping track of distributed Name Server processing.

Distributed Name Server Processing:

Distributed Name Server 304 commands may be received from N-Ports, other switches, or other switch modules on the same switch. Process flow for each of them is described below, according to one aspect of the present invention.

The following provides a list of Name Server 304 commands that are processed per FC-GS-3, FC-SW-2 and the executable process steps described below with respect to FIGS. 4A-9

Get All Next ("GA_NXT") (Section 5.1.4.1 of FC-GS-3):

A request to obtain Name Server 304 objects associated with a specific Port identifier uses this query. Typically, Name Server 304 returns all Name Server 304 object(s) for the next higher valued Port Identifier registered with Name Server 304. The format of a GA-NXT request is provided in the aforementioned section of FC-GS-3.

Get Identifiers ("GI_A") (Section 5.14.2 of FC-GS-3): Name Server 304 returns identifiers after this request is received. This command allows a user of Name Server 304 to determine which domains and areas are available for use in the Domain_ID Scope field. The format of the query is provided in the aforementioned section of FC-GS-3.

GPN_ID (Get Port name ID), GNN_ID (Get Node Name ID), GCS_ID (Get Class of Service ID), GFT_ID (Get FC-4 Types), GPT_ID, (Get Port Type) GSPN_ID (Get Symbolic Port Name), GIPP_ID (Get IP Address), GFPN_ID (Get Fabric Port Name), GHA_ID (Get Hard Address), GFD_ID (Get FC-4 Descriptors), GFF_ID (Get FC-4 Features) Commands.

These commands are described in Sections 5.1.4.3 through 5.1.4.13 of FC-GS-3 and specify a fibre channel address. The processing of these commands is described below with respect to FIG. 7.

GID_PN (Get Port Identifier), GIPP_PN (Get IP address (Port)), GID_NN (Get Port Identifiers), GPN_NN (Get Port Names), GIP_NN (Get IP address (Node)), GIPA_NN (Get Initial Process Associator), GSNN_NN (Get Symbolic Node Name), GNN_IP (Get Node Name), GIPA_IP, (Get Initial Process Associator), GID_FT (Get Port Identifiers), GPN_FT (Get Port Names), GNN_FT (Get Node Names), GID_PT (Get Port Identifiers), GID_IPP (Get Port Identifier), GPN_IPP (Get Port Name), GID_FF (Get Port Identifiers).

The foregoing commands are described (including the command format(s)) in sections 5.1.4.14 through 5.1.4.29 of FC-GS-3 respectively. The commands are Name Server 304 queries seeking specific information, as discussed in the foregoing relevant sections. The execution of the commands in a multi-module switch, according to one aspect of the present invention is described below.

RIP_NN (Register IP address (Node), RIPA_NN (Register Initial Process Associator), RSNN_NN (Register Symbolic Node Name).

Section 5.1.4.40 through 5.1.4.42 of FC-GS-3 describe the foregoing commands. The execution of the commands in a multi-module switch, according to one aspect of the present invention is described below.

Figure 4A:
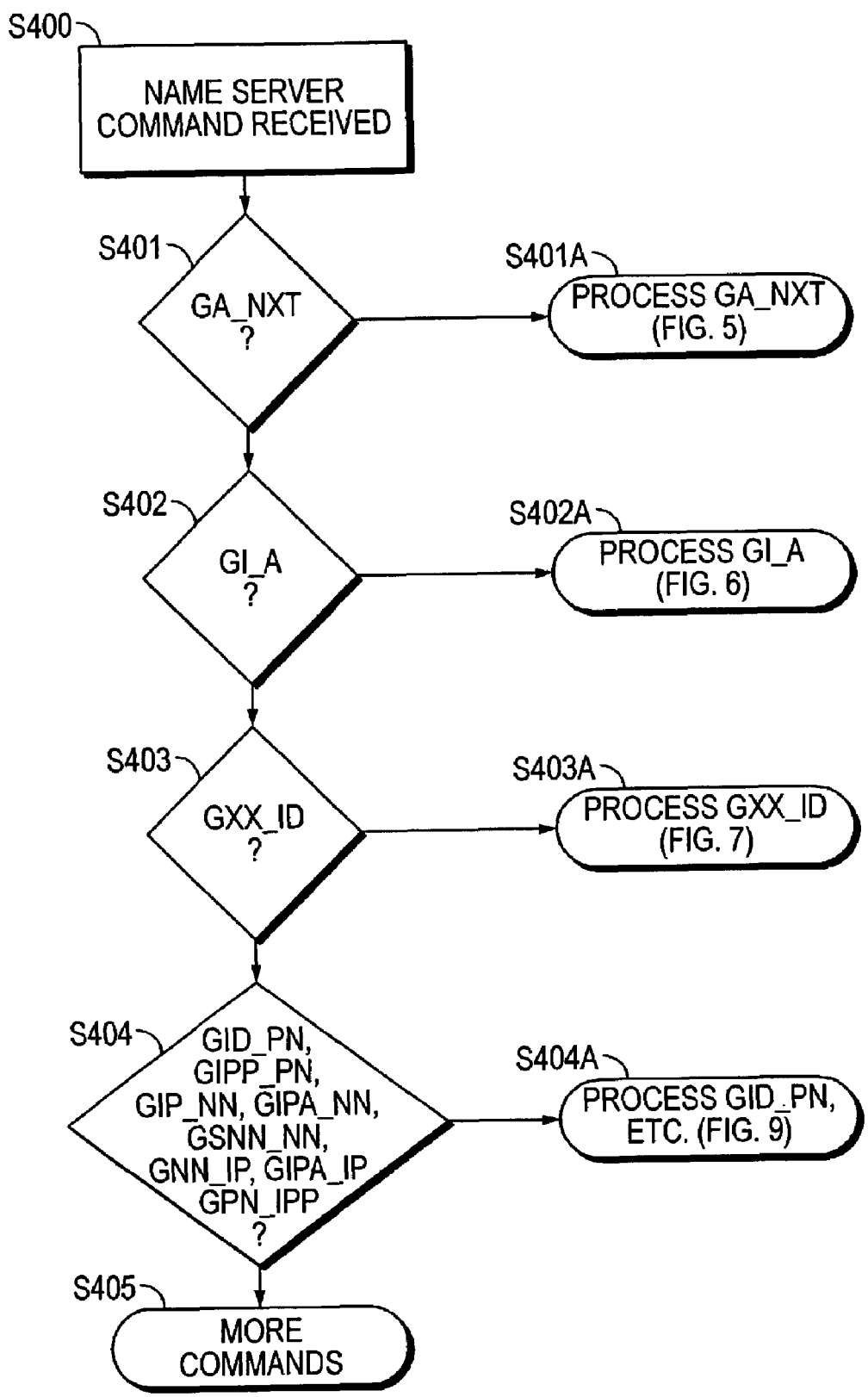
FIGS. 4A and 4B shows a flow diagram of the overall process for handling Name Server commands in a multi-module fibre channel switch, according to one aspect of the present invention.
Figure 4B:
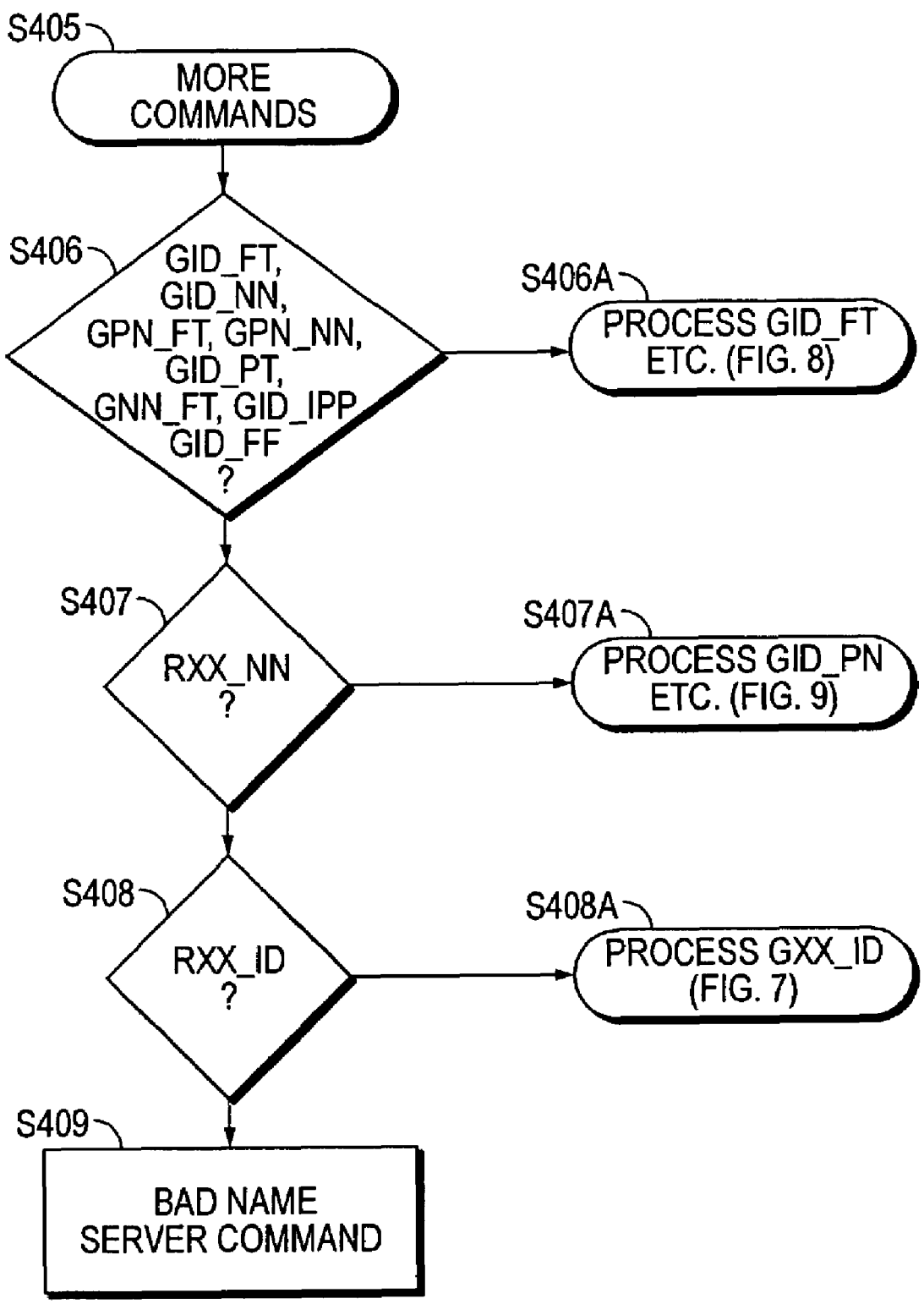

FIGS. 4A-4B shows an overall flow diagram showing process steps for executing Name Server commands in a multi-module switch, according to one aspect of the present invention.

In step S400, Name Server commands are received by a switch module (e.g. 102A) from an N-port or any other source.

In step S401, if a GA_NXT command is received by switch module 102A, the process moves to step S401A described below with respect to FIG. 5.

In step S402, if a GI_A query is received by switch module 102A, then the process moves to step S402A described below with respect to FIG. 6.

In step S403, if any identifier command (herein after collectively referred to as "Gxx_ID", which includes, commands GPN_ID (Get Port name ID), GNN_ID (Get Node Name ID), GCS_ID (Get Class of Service ID), GFT_ID (Get FC-4 Types), GPT_ID, (Get Port Type) GSPN_ID (Get Symbolic Port Name), GIPP_ID (Get IP Address), GFPN_ID (Get Fabric Port Name), GHA_ID (Get Hard Address), GFD_ID (Get FC-4 Descriptors), GFF_ID (Get FC-4 Features)) are received by switch module 102A, then in step S403A, the commands are processed, as described below with respect to FIG. 7.

In step S404, if switch module 102A receives commands GID_PN, GIPP_PN, GIP_NN, GIPA_NN, GSNN_NN, GNN_IP, GIPA_IP, GPN_IPP (collectively referred to as GID_PN etc.) then in step S404A, the commands are processed as discussed below with respect to FIG. 9.

In step S405, the process ascertains if there are more commands.

In step S406, if switch module 102A receives commands GID_FT, GID_NN, GPN_FT, GPN_NN, GID_PT, GNN_FT, GID_IPP and GID_FF (collectively referred to herein as "GID_FT etc."), then in step S406A, the commands are processed as discussed below with respect to FIG. 8.

In step S407, if switch module 102A receives RIP_NN, RIPA_NN and RSNN_NN (collectively referred herein as "Rxx_NN"), then in step S407A, the commands are processed as discussed below with respect to FIG. 9.

In step S408, if switch module 102A receives commands RPN_ID, RNN_ID, RCS_ID, RFT_ID, RSPN_ID, RPT_ID, RIPP_ID, RHA_ID, RFD_ID, or RFF_ID (collectively referred to herein as "Rxx_ID"), then in step S408A, the commands are processed as discussed below with respect to FIG. 7.

In step S409, switch module 102A ascertains if a Name Server command was in error and the process ends.

Figure 5:
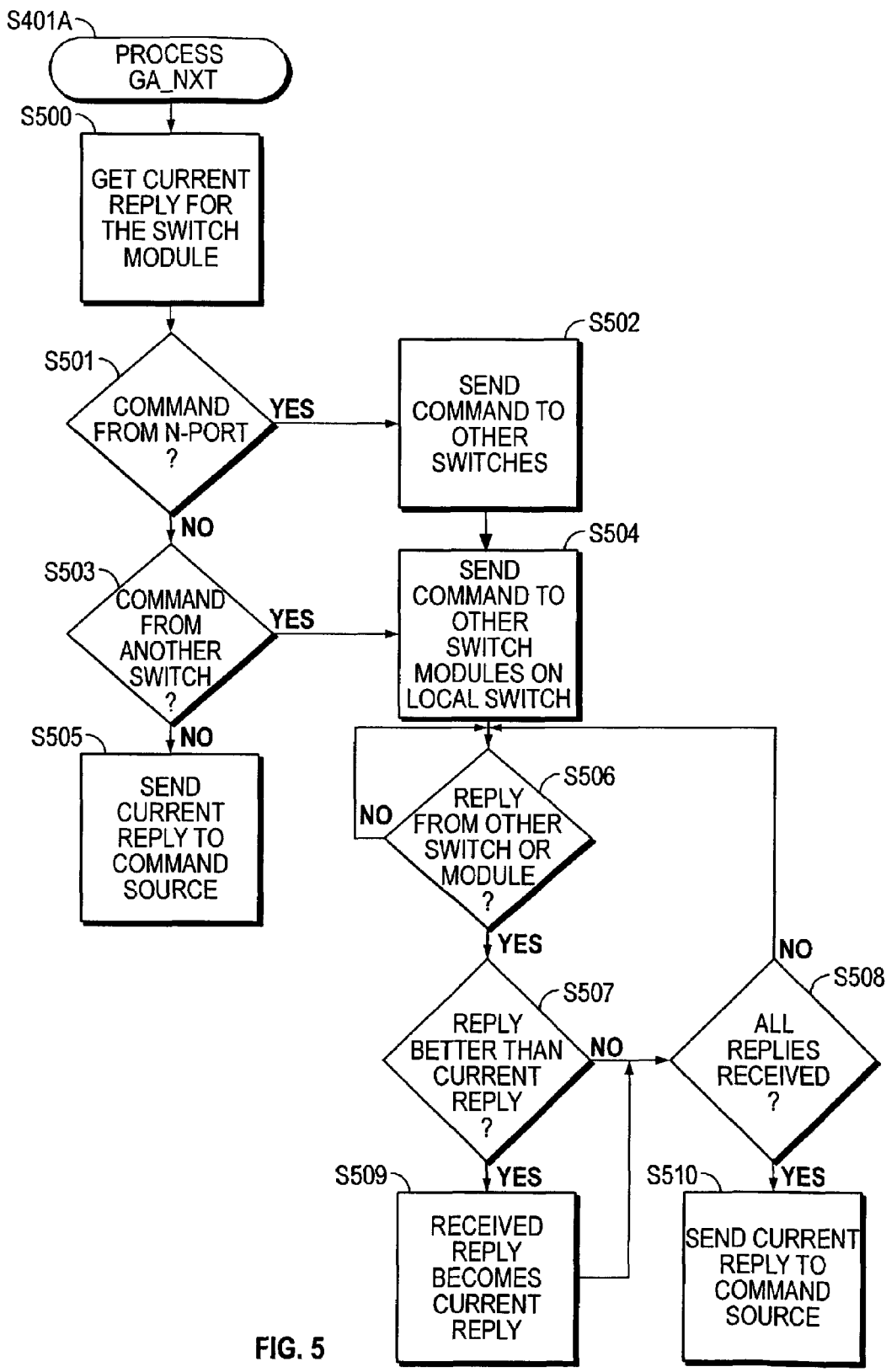
FIG. 5 is a flow diagram of processing GA-NXT commands in a multi-module fibre channel switch, according to one aspect of the present invention.

FIG. 5 is a flow diagram for processing GA_NXT command (step S401A) in a multi-module switch, according to one aspect of the present invention.

In step S500, a switch module (e.g. 102A) determines the current, best reply to the received GA_NXT command among N-ports on this module.

In step S501, switch module 102A determines if the GA_NXT command was received from a N-Port. If the command was received from a N-Port, then in step S502, the command is sent to all other external switches, and in step S504 to the other switch modules on the local switch (e.g. 200).

If the command was not received from an N-Port, then in step S503, switch module 102A determines if the command was received from another switch. If the command was received from another switch, then in step S504, the command is sent to other switch modules (102B-102F) on the local switch.

In step S506, switch module 102A determines if a reply to the GA-NXT command has been received from another switch or local switch module(s). If a reply is not received, then switch module 102A waits for the reply.

If a reply is received in step S506, then in step S507, the reply is compared to the current reply (S500) to determine if the received reply is better than the current reply. If the received reply is better than the current reply, then in step S509, the received reply becomes the current reply.

In step S508, switch module 102A determines if all replies have been received. If all replies have not been received, then the process goes back to step S506.

If all replies have been received in step S508, then in step S510, the current reply is sent to the GA_NXT command source.

If the command, GA-NXT was received from another switch module (in step S503), then in step S505, a reply is sent to the source of the GA_NXT command.

Figure 6:
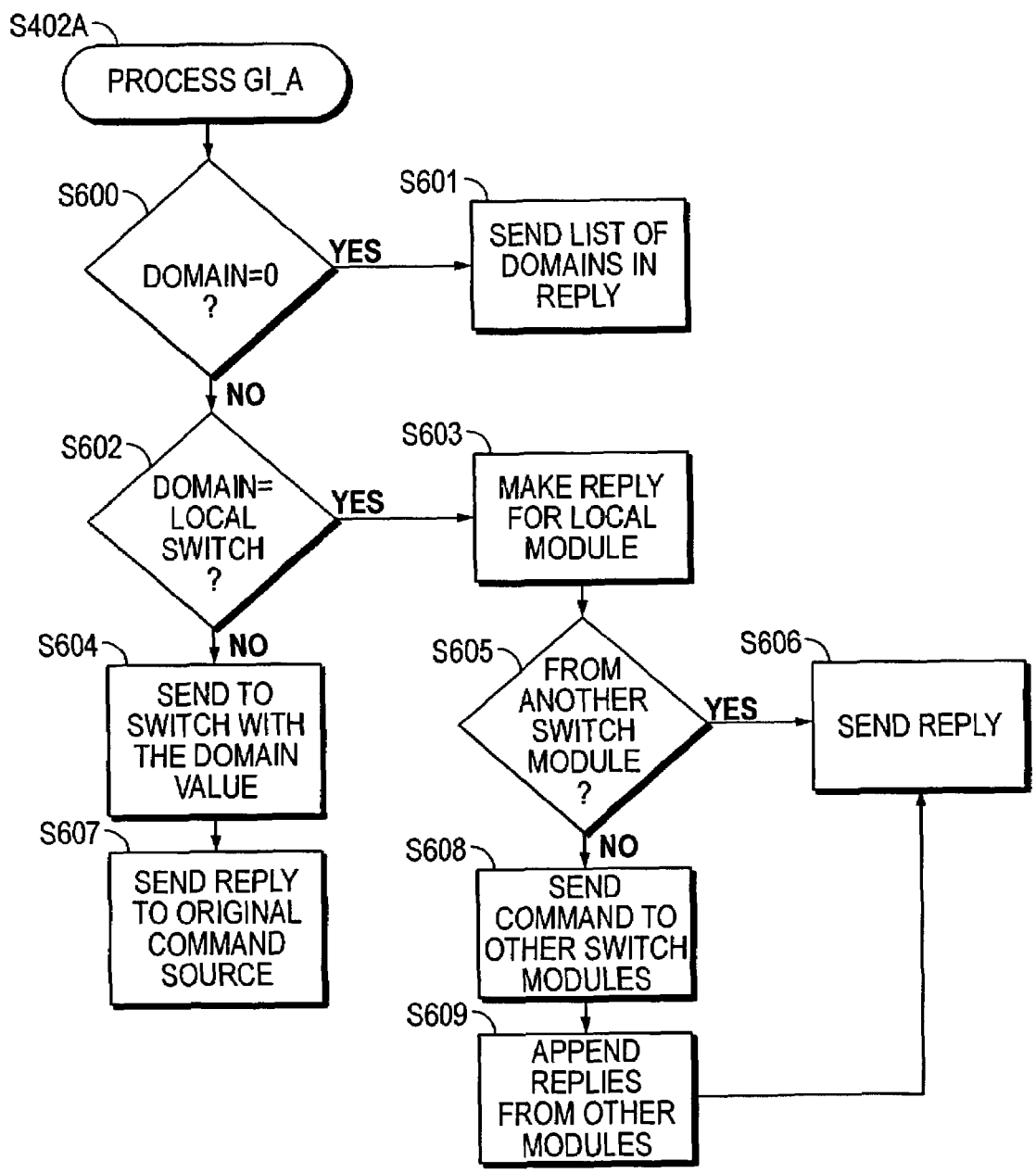
FIG. 6 is a flow diagram of processing GI_A commands in a multi-module fibre channel switch, according to one aspect of the present invention.

FIG. 6 shows a flow diagram to process GI_A command (step S402A), as received by a switch module (e.g. 102A).

In step S600, switch module 102A determines if the domain identification (Domain ID) value is equal to zero. If Domain ID is equal to zero then in step S601, a list of domains is sent as a reply to the GI_A command.

If the Domain ID value is not equal to zero, then in step S602, switch module 102A determines if the Domain ID value is the same as that of the local switch (e.g. 200). If the Domain ID value is not the same, then in step S604, the command (GI_A) is sent to the switch with the Domain ID value specified in the command payload.

In step S607, switch module 102A receives a response from the switch in step 604 and a reply to GI_A is sent to the source.

In step S602, if the Domain ID specified in the GI_A command is the same as that of local switch (e.g. 200), then in step S603, a reply with information from the local switch module is prepared.

If the GI_A request is from another switch module (102B-102F) as ascertained in step S605, then in step S606, a reply is sent to the source.

If the request is not from another switch module, then the GI_A message is sent to all switch modules (102B-102F) in step S608.

In step S609, the replies from the other switch modules are appended to the local reply. When all replies from other switch modules have been received, the combined data is sent as a reply to the original source of the GI_A command in step S606.

Figure 7:
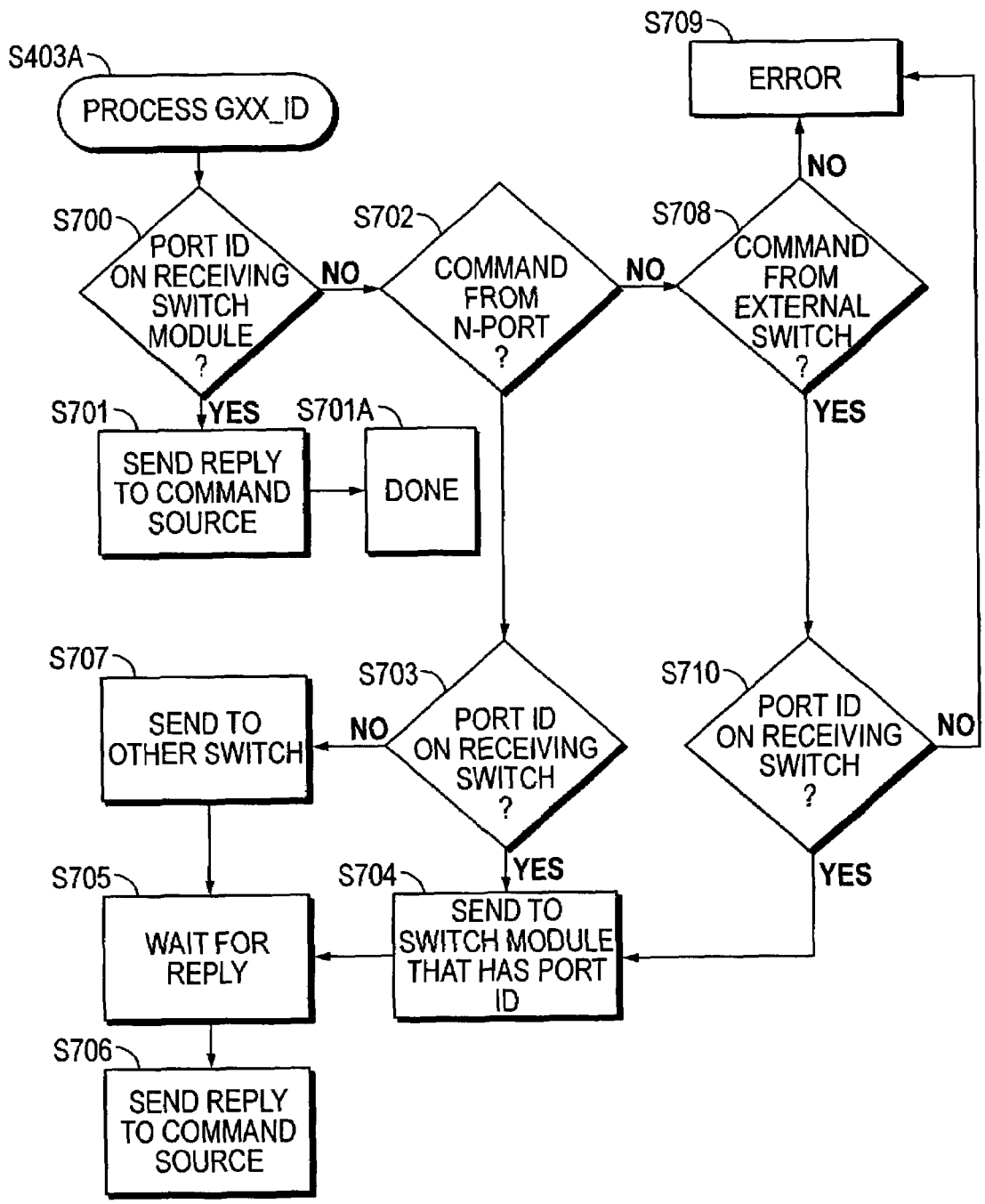
FIG. 7 is a flow diagram of processing Gxx_ID commands (Name Server commands that request data associated with a particular Fiber Channel N-Port ID) in a multi-module fibre channel switch, according to one aspect of the present invention.

FIG. 7 is a flow diagram of process steps for responding to Gxx-ID commands received by a switch module (e.g. 102A).

In step S700, switch module 102A ascertains if the port ID specified in the source Gxx_ID or Rxx_ID command is same as that of switch module 102A. If the port ID matches the local switch module 102A, then in step S701, a reply is sent and the process ends in step S701A.

If the port ID is not that of switch module 102A, then in step S702, switch module 102A determines if the command is from an N-port. If the command is from an N-port, then in step S703, the process determines if a port ID is specified for the local switch (for example, switch 200). If a port ID is specified then in step S704, the command is sent to the switch module whose port ID is specified. Switch module 102A waits for a reply in step S705 and after a reply is received in step S705, a response is sent to the source of the command in step S706.

If a port ID is not on the local switch then in step S707, the command is sent to another switch and the process steps S705 and S706 are performed.

If in step S702, the command is not from an N-Port, then in step S708, the process ascertains if the command is from an external switch. If the command is from the external switch, then in step S710, the process determines if a port ID of a switch module is specified in the command (for example, port ID for switch modules 102B-102F in switch 200). Thereafter, process steps S704, S705, and S706 are performed.

If in step S708 the command is not from an external switch then in step S709, an error response is generated and sent to the command source.

Figure 8:
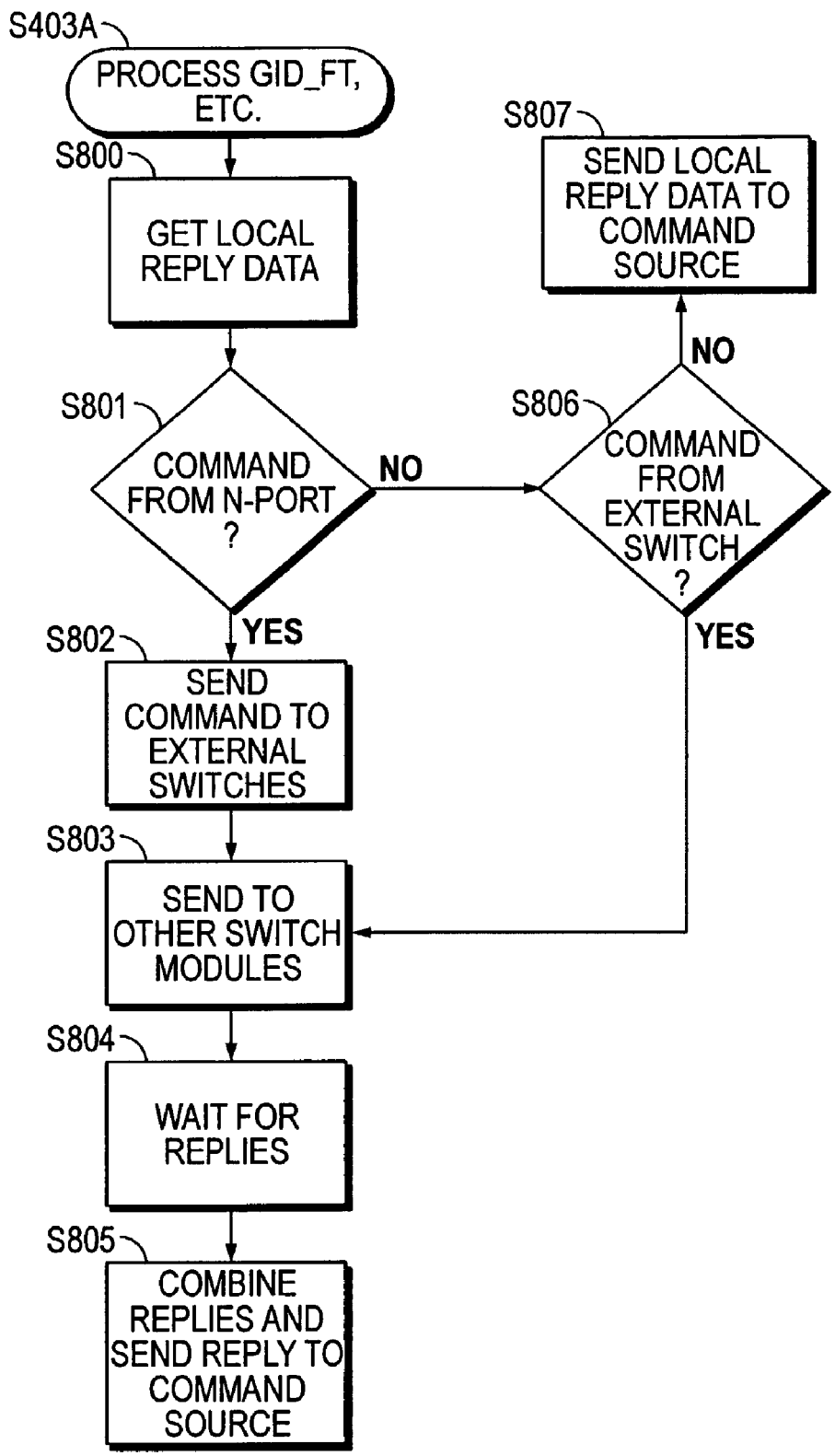
FIG. 8 is a flow diagram is a flow diagram of processing GID_FT and other commands in a multi-module fibre channel switch, according to one aspect of the present invention.

FIG. 8 is a flow diagram of process steps in a multi-module switch for responding to GID_FT etc. commands (step S406A). These commands generate a list of reply data that matches the search object in the command.

In step S800, the switch module that gets the command (e.g. 102A) gets local reply data for the command (for example, a GID_FT command will create a list of any local port IDs whose Name Server data contains the FC-4 type specified in the GID_FT command).

In step S801, the process determines if the command is from an N-Port. If it is from an N-Port, then the command is sent to all external switches in step S802, and to all other switch modules in step S803.

Thereafter, in step S804, switch module 102A waits for replies from the switches.

In step S805, response from the external switches and local modules is combined and a reply is sent to the source of the command.

If the command is not from an N-Port then in step S806, the process determines if the command is from an external switch. If the command is from an external switch, then the process moves to step S803, which sends the command to all other switch modules, followed by steps S804 and S805.

If the command is not from an external switch, then in step S807, the local reply from step S800 is sent to the command source.

Figure 9:
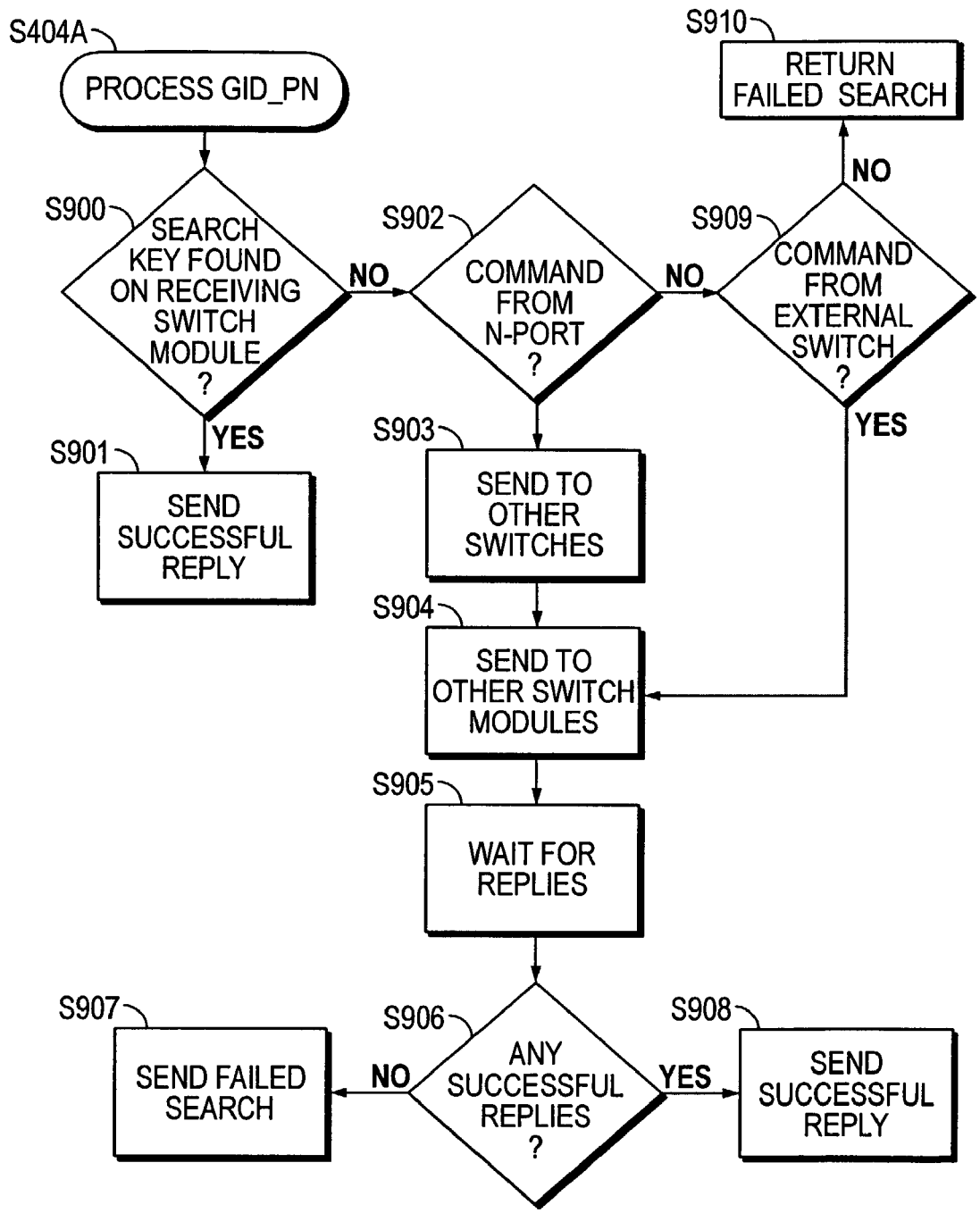
FIG. 9 is a flow diagram is a flow diagram of processing GID_PN and other commands in a multi-module fibre channel switch, according to one aspect of the present invention.
Figure 1:
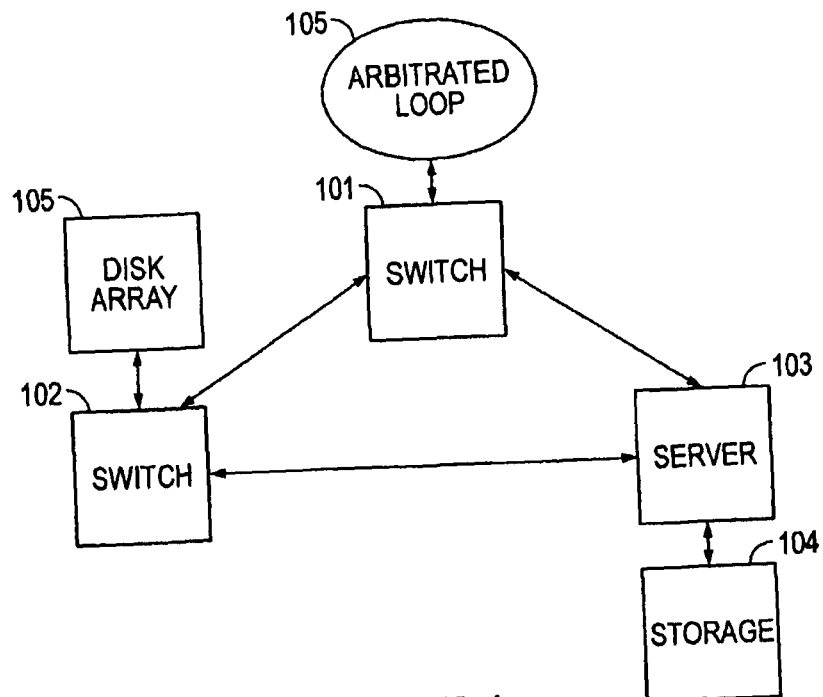
Figure 2:
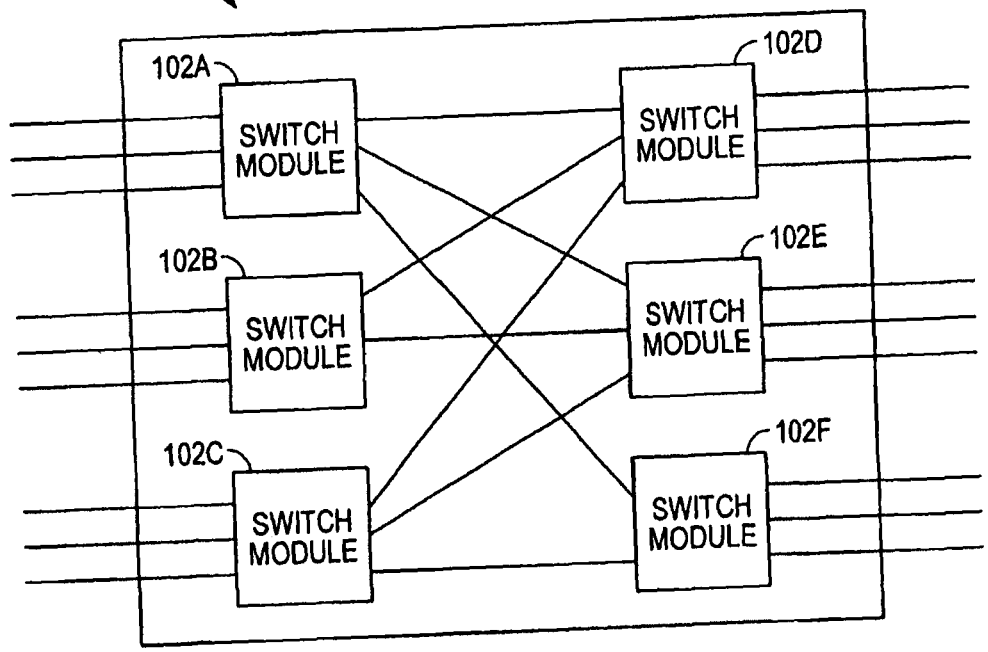
Figure 3:
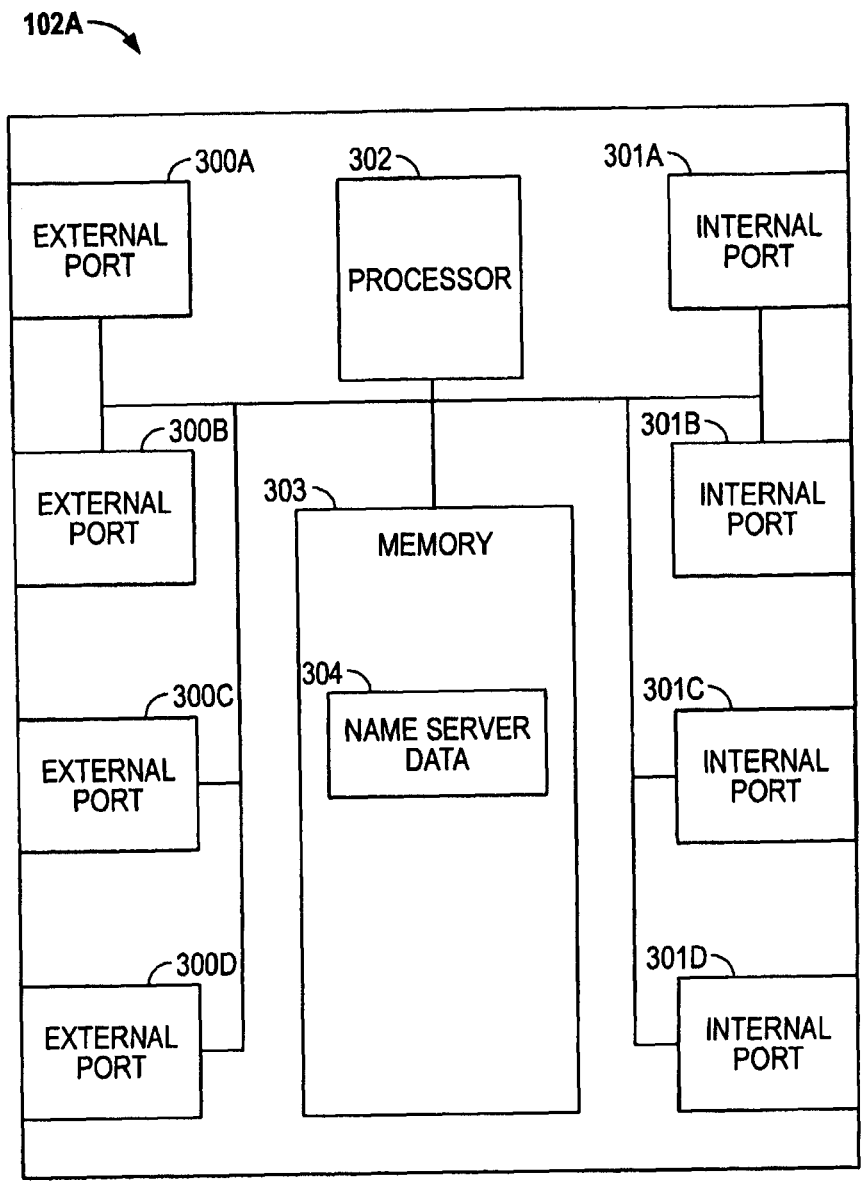
Figure 4A:
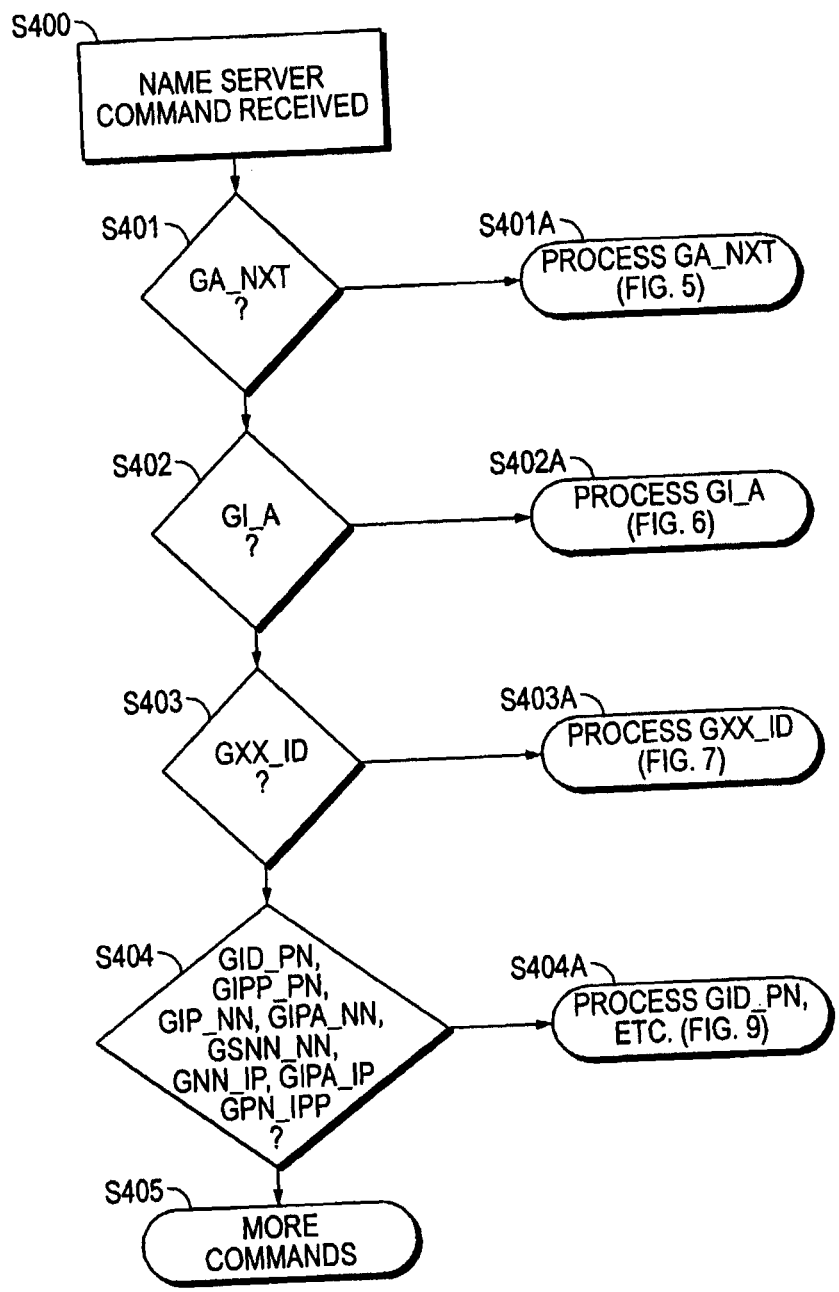
Figure 4B:
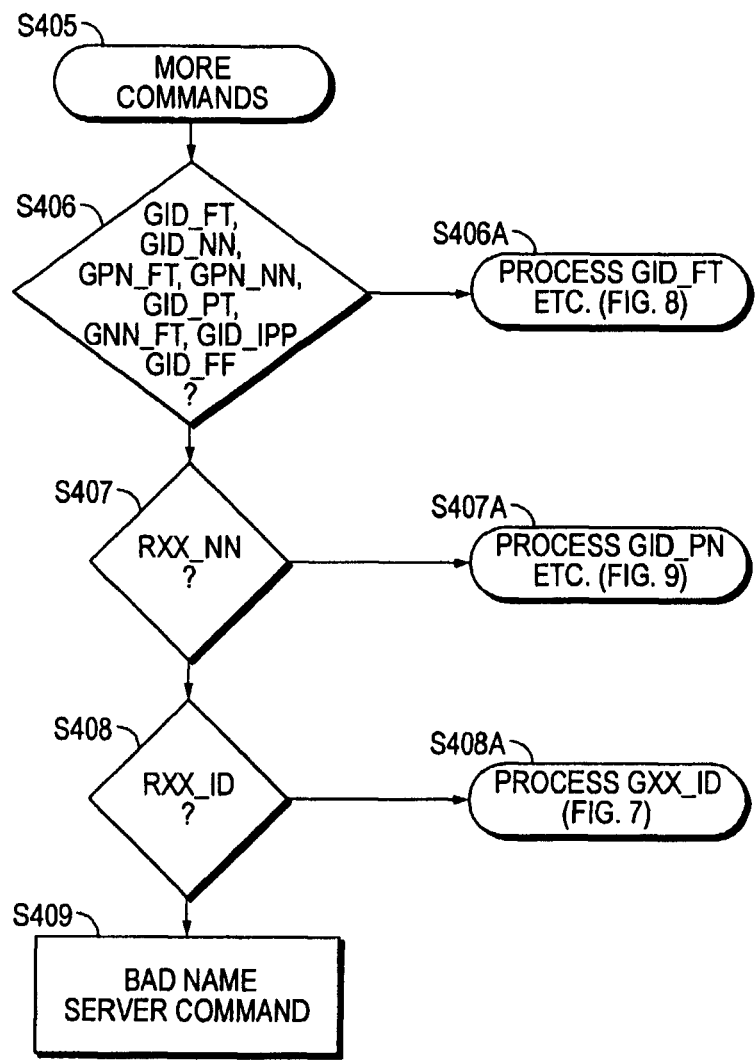
Figure 5:
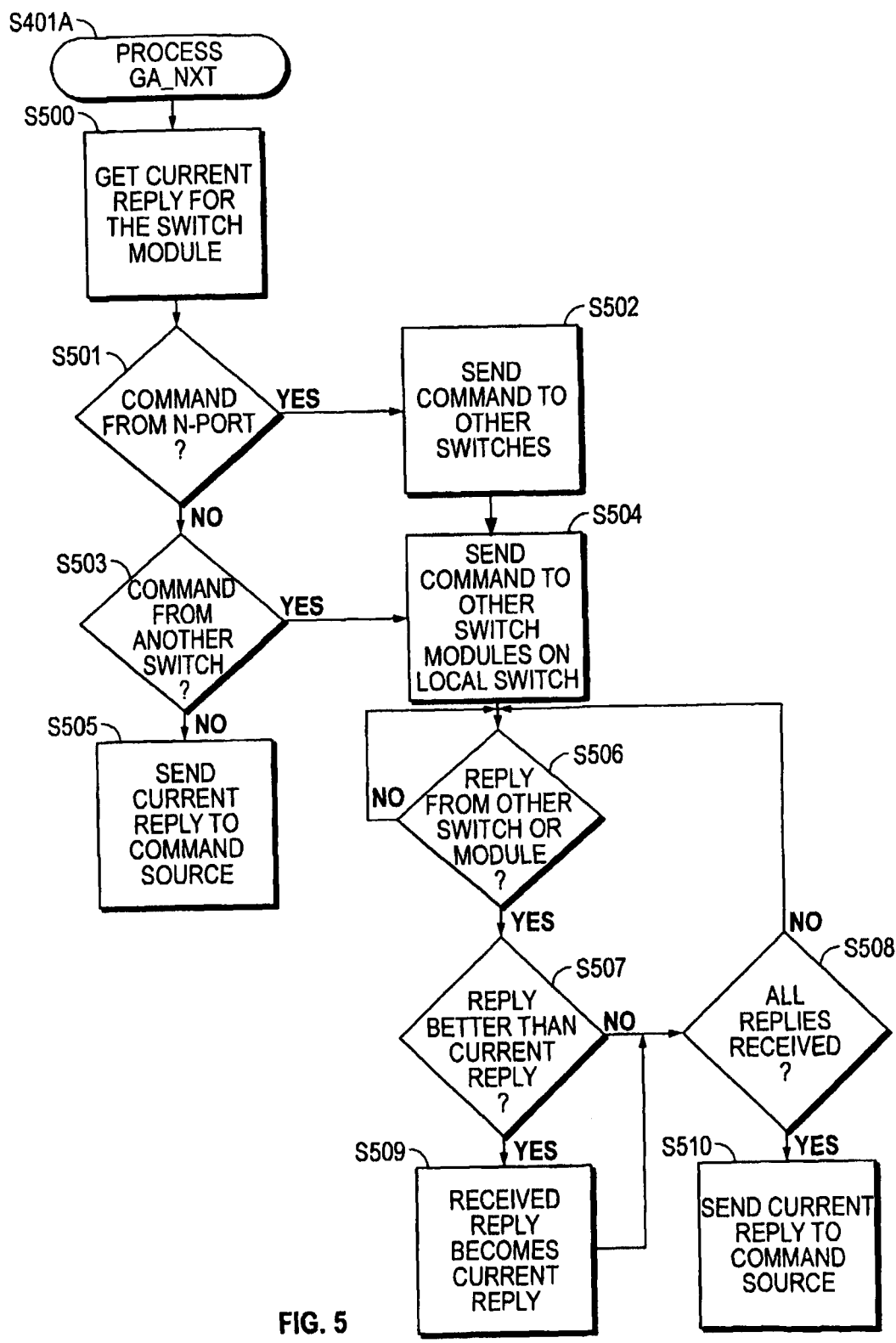
Figure 6:
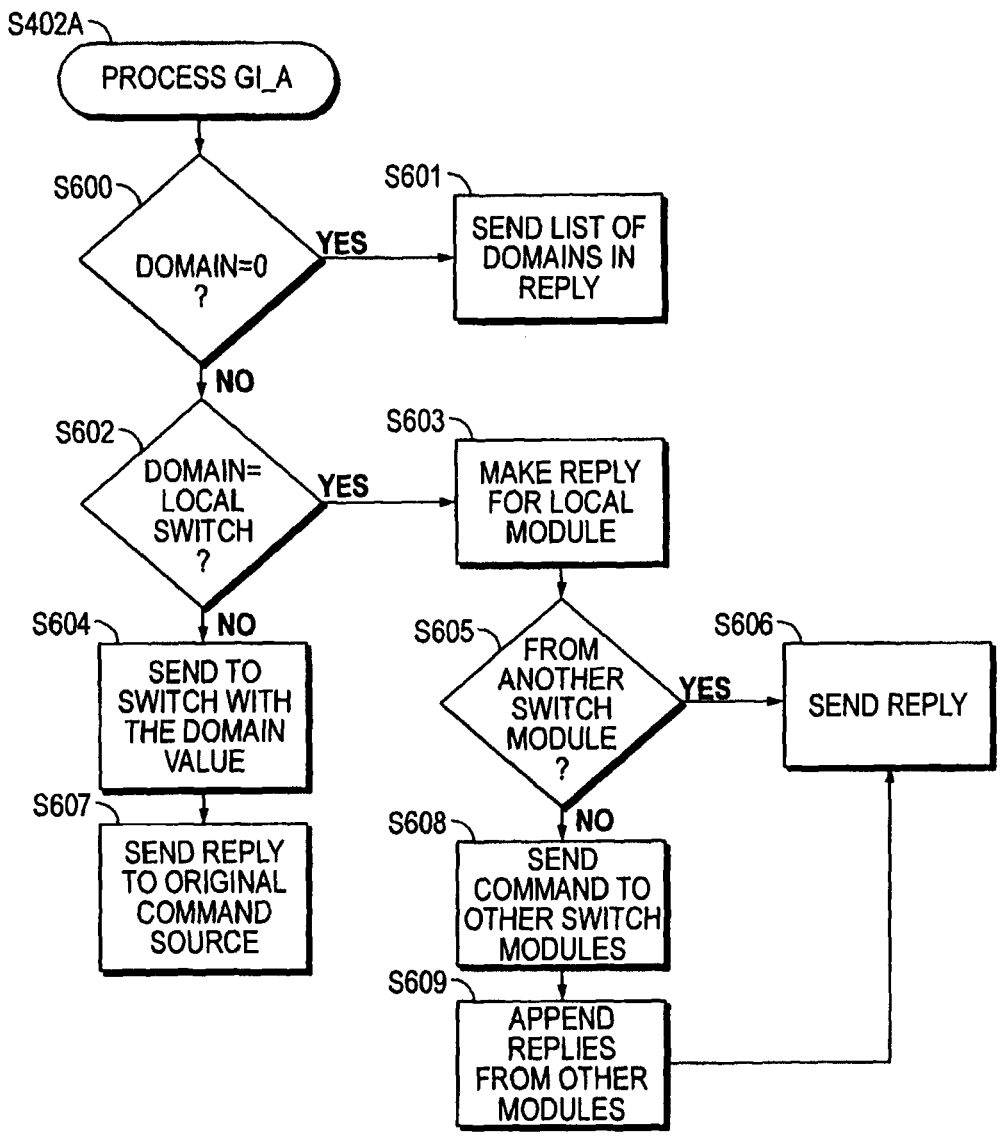
Figure 7:
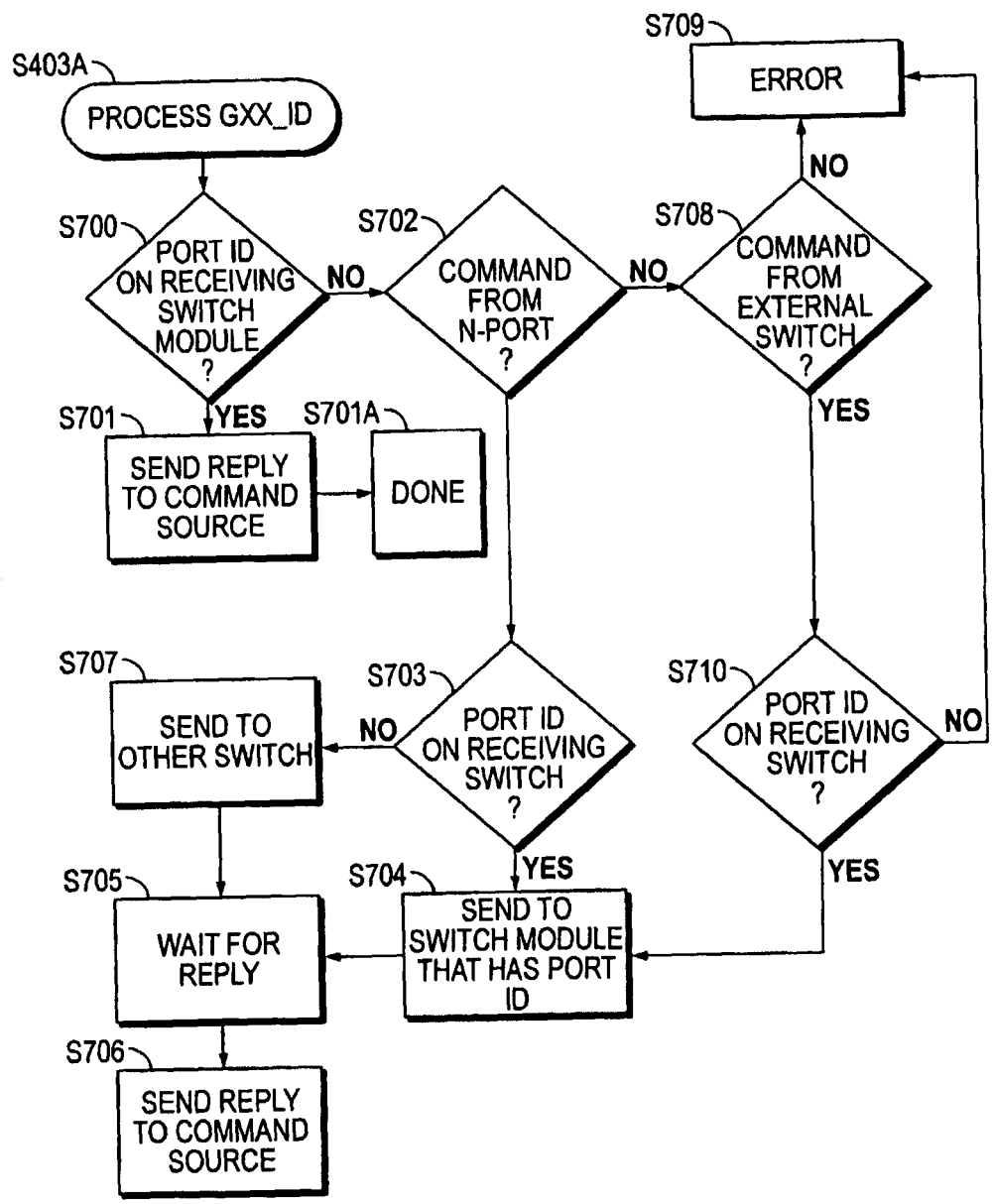
Figure 8:
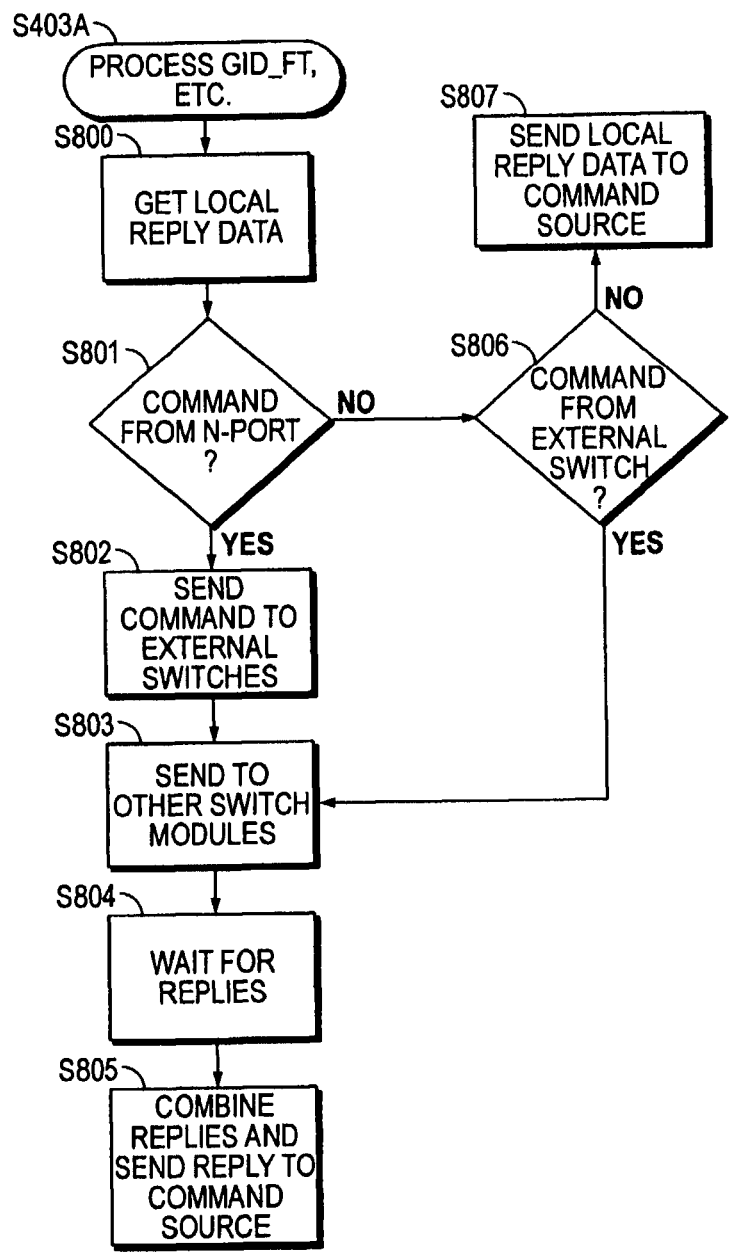
Figure 9:
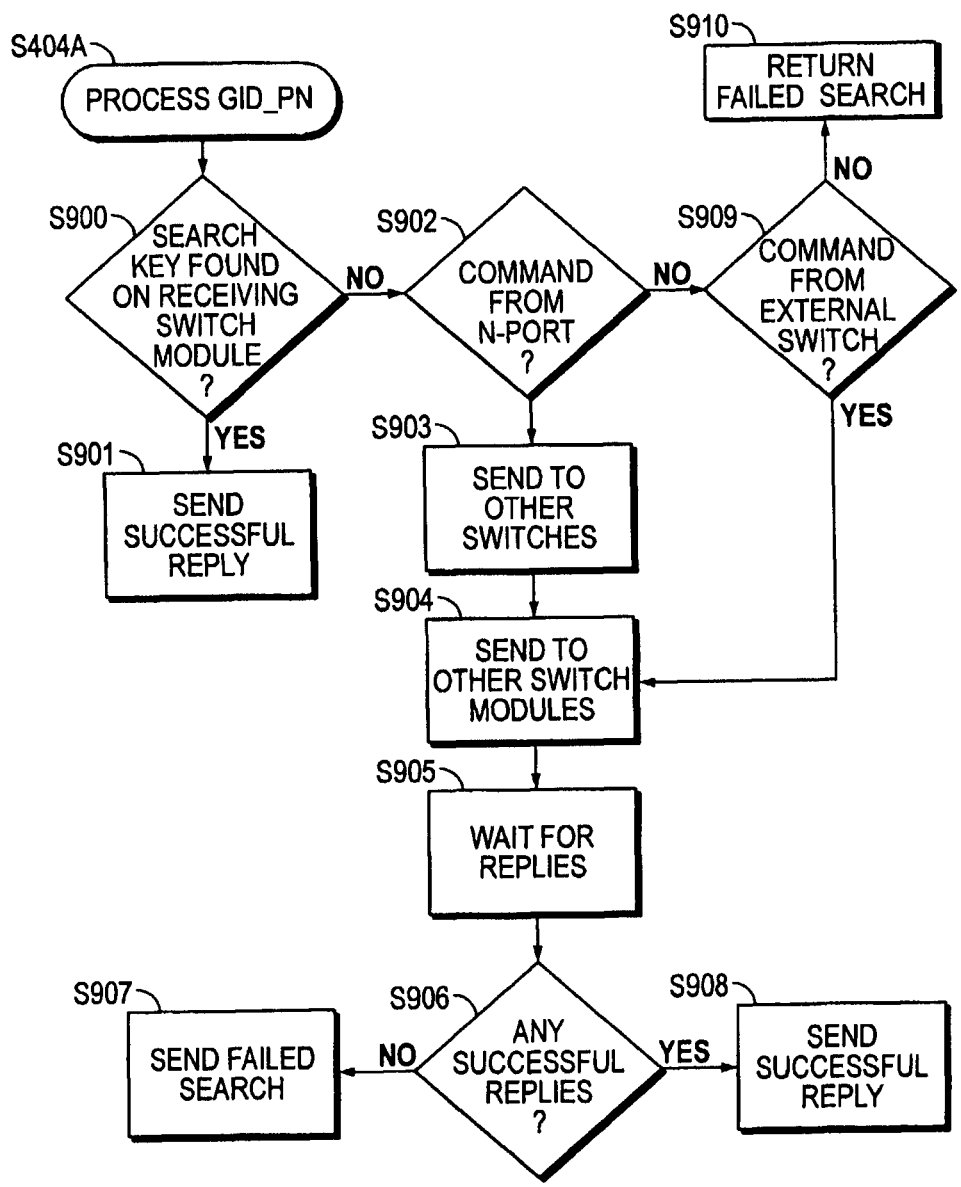

FIG. 9 shows a flow diagram for processing GID_PN etc. commands from step S404A.

Turning in detail to FIG. 9, in step S900, the process determines if a search key is found on the switch module that receives the command, for example, switch module 102A.

If a search key is found, then in step S901, a successful reply is sent to the source command.

If a search key is not found in step S900, then in step S902, the process determines if the command is from an N-Port. If the command is from a N-Port, then in step S903, the command is sent to all other switches, and in step S904, the command is sent to all the switch modules within the multi-module switches (e.g. switch 200).

In step S905 switch module 102A waits for a reply.

In step S906, the process determines if any successful replies have been received and in step S908, successful replies are sent to the command source.

If successful replies are not received, then in step S907, failed search results are sent to the command source.

If the command is not from an N-Port (step S902), then in step S909, the process determines if the command is from an external switch.

If the command is from an external switch, then the process moves to step S904, and if the command is not from an external switch, then in step S910, a failed search result is sent to the command source.

In one aspect, the present invention allows a group of switch modules to be combined into a single switch for Name Server operations and hence allows efficient execution of Name Server commands.

Although the present invention has been described with reference to specific embodiments, these embodiments are illustrative only and not limiting. Many other applications and embodiments of the present invention will be apparent in light of this disclosure and the following claims.

What is claimed is:

1. A method for processing a Get Identifier ("GI_A") command received by a switch module of a multi-module fibre channel switch with a plurality of switch modules, comprising:
    determining if a domain value in the GI_A command is that of the multi-module fibre channel switch; and if the domain value is equal to that of the multi-module fibre channel switch and if the GI_A command is not sent by one of the plurality of switch modules of the multi-module fibre channel switch, then combining replies from the plurality of switch modules of the multi-module fibre channel switch with a reply of the switch module receiving the GI_A command; and
    sending the combined reply to a source of the GI_A command.

2. The method of claim 1, further comprising:
    sending a reply to the GI_A command to one of the plurality of switch module of the multi-module fibre channel switch, if the one of the plurality of switch modules had sent the GI_A command.

3. The method of claim 1, further comprising:
    sending a list of domains as a reply to a source of the GI_A command, if the domain value of the GI_A command is equal to zero.

4. A method for processing a Gxx_ID command received by a switch module of a multi-module fibre channel switch with a plurality of switch modules, comprising:
    determining if the Gxx_ID command is received from an N_port, if a port identification value in the Gxx_ID command is not the same port identification value for the switch module that receives the Gxx_ID command; and
    sending the Gxx_ID command to a switch module from among one of the plurality of switch modules of the multi-module fibre channel switch whose port identification value matches with the port identification value in the Gxx_ID command;
    determining if the Gxx_ID command is received from a fibre channel switch external to the multi-module fibre channel switch, if the Gxx_ID is not received from a N_Port; and
    sending the Gxx_ID command to a switch module from among one of the plurality of switch modules of the multi-module fibre channel switch whose port identification value matches with the port identification value of the Gxx_ID command.

5. A method for processing a command that searches for a Name Server object and the command is received by a switch module of a multi-module fibre channel switch with a plurality of switch modules in a fibre channel system, comprising:
    determining if the command is received from an N-Port if a search key is not found on the switch module that receives the command;
    sending the command to any other fibre channel switch and the plurality of switch modules of the multi-module fibre channel switch, if the command is from an N_port; and
    sending a successful reply to the command source if the successful reply is received from the other fibre channel switch and the plurality of switch modules of the multi-module fibre channel switch.

6. The method of claim 5, further comprising:
    determining if the command is received from a switch external to the multi-module fibre channel switch, if the command is not from an N_Port;
sending the command to other switch modules of the multi-module fibre channel switch, if the command was received from an external switch; and sending an error message to a source if the command was not received from an external switch.

7. The method of claim 1, further comprising:
sending a reply to a source of the GI_A command, if the domain value in the GI_A command is not that of the multi-module fibre channel switch.

8. A method for processing a Gxx_ID command received by a switch module of a multi-module fibre channel switch with a plurality of switch modules, comprising:
determining if the Gxx_ID command is received from an N_port, if a port identification value in the Gxx_ID command is not the same port identification value for the switch module that receives the Gxx_ID command;
sending the Gxx_ID command to a switch module from among one of the plurality of switch modules of the multi-module fibre channel switch whose port identification value matches with the port identification value in the Gxx_ID command;
determining if the Gxx_ID command is received from a fibre channel switch external to the multi-module fibre channel switch, if the Gxx_ID is not received from a N_Port, and
sending the Gxx_ID command to a switch module from among one of the plurality of switch modules of the multi-module fibre channel switch whose port identification value matches with the port identification value of the Gxx_ID command;
wherein an error response is generated and sent to the Gxx_ID command source, if the Gxx_ID command is not received from an external fibre channel switch.

9. The method of claim 5, wherein the command is one or more of GID_PN (Get Port Identifier), GID_NN (Get Port Identifiers), GIPP_PN (Get IP address (Port)), GPN_NN (Get Port Names), GIP_NN (Get IP address (Node)), GIPA_NN (Get Initial Process Associator), GSNN_NN (Get Symbolic Node Name), GNN_IP (Get Node Name), GIPA_IP (Get Initial Process Associator), GID_FT (Get Port Identifiers), GPN_FT (Get Port Names), GNN_FT (Get Node Names), GID_PT (Get Port Identifiers), GID_IPP (Get Port Identifier), GPN_IPP (Get Port Name) and GID_FF (Get Port Identifiers).

* * * * *

UNITED STATES PATENT AND TRADEMARK OFFICE
CERTIFICATE OF CORRECTION

PATENT NO.       : 7,362,717 B1
APPLICATION NO.  : 10/263858
DATED            : April 22, 2008
INVENTOR(S)      : Steven M. Betker It is certified that error appears in the above-identified patent and that said Letters Patent is hereby corrected as shown below:

ON THE TITLE PAGE:
In Item (57), in column 2, under "Abstract", line 2, delete "fiber" and insert -- fibre --, therefor.

In Item (57), in column 2, under "Abstract", line 7, delete "fiber" and insert -- fibre --, therefor.

In Item (57), in column 2, under "Abstract", line 9, delete "fiber" and insert -- fibre --, therefor.

IN THE DRAWINGS:
On sheet 1 of 9, in FIG. 1, line 1, delete "105" and insert -- 106 --, therefor.

On sheet 1 of 9, in FIG. 1, line 1, beside "ARBITRATED LOOP" insert -- 100 --.

On sheet 2 of 9, in FIG. 3, Reference Numeral 303, line 1-3, delete " 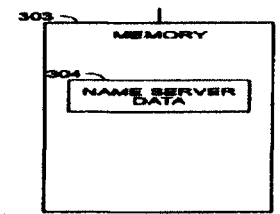 " and insert -- 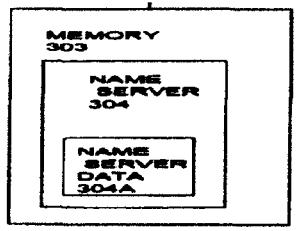 --, therefor.

On sheet 6 of 9, in FIG. 6, Reference Numeral S602, line 1-3, delete "DOMAIN = LOCAL SWITCH" and insert -- DOMAIN ID = LOCAL SWITCH --, therefor.

Signed and Sealed this

Sixteenth Day of November, 2010

David J. Kappos
*Director of the United States Patent and Trademark Office*

IN THE CLAIMS:

In column 10, line 28, in claim 4, delete "N_port," and insert -- N_Port, --, therefor.

In column 10, line 56, in claim 5, delete "N_port," and insert -- N_Port, --, therefor.

In column 11, line 10, in claim 8, delete "N_port," and insert -- N_Port, --, therefor.

In column 11, line 21, in claim 8, delete "N_Port," and insert -- N_Port; --, therefor.